United States Patent [19]

Berry et al.

[11] 4,079,966
[45] Mar. 21, 1978

[54] INSULATED SELF-THREADING FITTING

[75] Inventors: Richard C. Berry, Camillus; Sherald G. Wilson, Syracuse, both of N.Y.

[73] Assignee: Crouse-Hinds Company, Syracuse, N.Y.

[21] Appl. No.: 673,325

[22] Filed: Apr. 5, 1976

[51] Int. Cl.² ............................................. F16L 33/22
[52] U.S. Cl. ........................................ 285/24; 285/40;
 285/55; 285/251; 285/DIG. 22
[58] Field of Search ......... 285/40, 251, 259, DIG. 22,
 285/162, 256, 24, 331, 249, 248, 55

[56] References Cited

U.S. PATENT DOCUMENTS

| 2,147,353 | 2/1939 | Scholtes | 285/256 X |
|---|---|---|---|
| 2,580,818 | 1/1952 | Mundy et al. | 285/40 |
| 3,220,753 | 11/1965 | Kasidas | 285/256 X |
| 3,231,156 | 1/1966 | Schultz | 285/DIG. 22 |
| 3,525,542 | 8/1970 | Belart et al. | 285/256 |
| 3,726,547 | 4/1973 | Cox, Jr. | 285/251 |
| 3,791,680 | 2/1974 | Cleare | 285/251 X |
| 3,844,588 | 10/1974 | Jocsak | 285/DIG. 22 X |

FOREIGN PATENT DOCUMENTS

| 253,751 | 6/1926 | United Kingdom | 285/251 |

*Primary Examiner*—Thomas F. Callaghan
*Attorney, Agent, or Firm*—Sughrue, Rothwell, Mion, Zinn and Macpeak

[57] ABSTRACT

A self-threading fitting having external threads at one end and tapered internal threads at the other end is provided with a snap-in tubular lining of insulating material which extends beyond the end of the fitting having the internal threads for insertion into a conduit to which the self-threading fitting is to be secured to thereby provide a guide which will insure axial alignment of the fitting with the conduit while insulating through wiring from the metal fitting.

1 Claim, 3 Drawing Figures

FIG. 1 – PRIOR ART
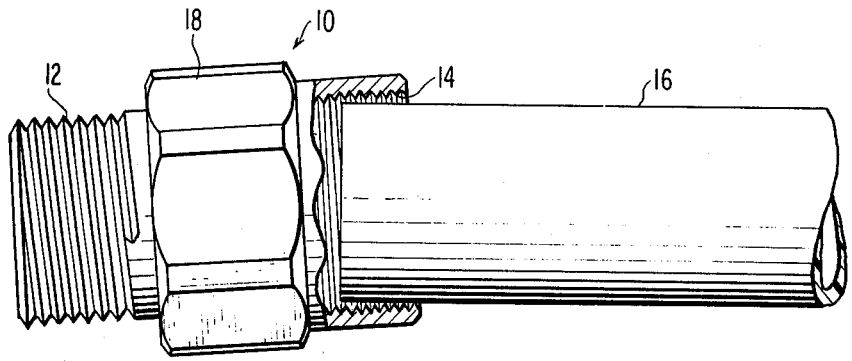
FIG. 2
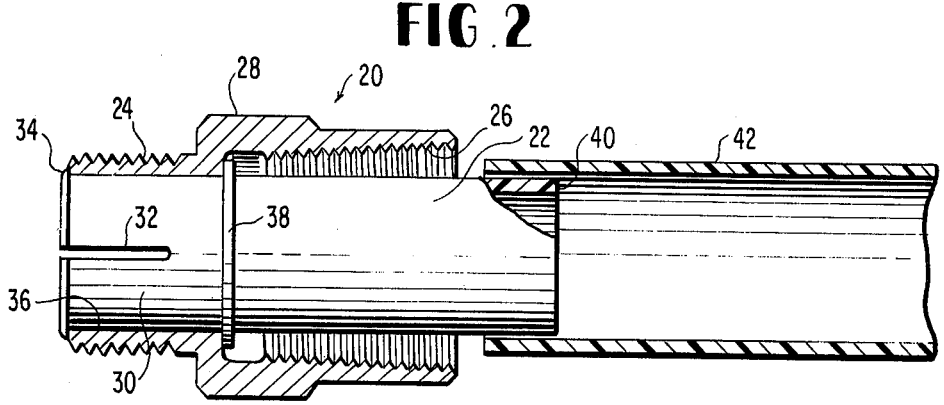
FIG. 3
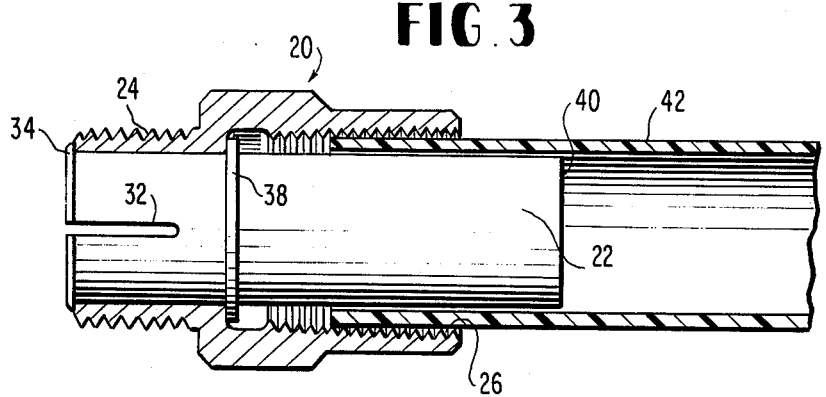

INSULATED SELF-THREADING FITTING

BACKGROUND OF THE INVENTION

1. Field of the Invention

The present invention is directed to self-threading fittings for electrical conduits and more specifically to a self-threading fitting having a tubular guide sleeve of insulating material.

2. Prior Art

In the past, when it was desired to provide a pipe thread on the end of an unthreaded length of conduit or pipe a fitting was utilized which was provided with external threads at one end and no threads at the other end. Such a fitting was secured to the end of the conduit by means of a slip-fit joint and retained thereon by means of set screws. Such an arrangement has several drawbacks, namely, that it is difficult to provide a fluid-tight seal between the fitting and the conduit and depending upon the location of the fitting and conduit it is often difficult to obtain suitable access to the set screws which must be driven in a direction transverse to the axis of the conduit.

Another well known type of fitting is the so-called self-threading fitting. The use of self-threading fittings, per se, similar to the fitting disclosed in the present application are old and well known in the art. However, a principle problem with such fittings has been the ability to thread the self-threading fitting on the end of a conduit in perfect coaxial alignment. Although the fitting and the conduit may be initially aligned with some degree of accuracy by visual observation it is almost impossible to maintain such alignment during the application of torque to the fitting as it is threaded onto the end of the conduit.

The use of an insulating lining within the fitting for an electrical conduit is also old and well known. However, in the past such liners were always assembled permanently to the fitting by means of adhesives, heatsealing or the like and would therefore not be generally suitable for field installation.

In the threaded coupling art it is old and well known to provide an elongated tubular extension on one part of the threaded coupling which will act as a pilot or guide sleeve during the threading engagement of a threaded fitting with another threaded fitting. Such extensions are generally integral with the coupling part and are therefore relatively expensive to manufacture. While such a pilot or guide sleeve may assist in bringing the two fittings toward each other for engagement they are not utilized to insure axial alignment during threading engagement since both fittings are prethreaded.

SUMMARY OF THE INVENTION

The insulated self-threading fitting according to the present invention provides a new and unique combination of a threaded fitting and a guide sleeve and liner of insulating material suitable for field installation to insure the axial alignment of the fitting with the conduit during self-threading engagement while insulating the metal fitting from any through-wiring.

The insulated self-threading fitting according to the present invention is comprised of a metal fitting having connecting means on one end and tapered internal threads at the opposite end and an insulated tubular sleeve which may be snapped into engagement with the fitting at one end with the opposite end extending beyond the fitting for insertion into a conduit to insure coaxial alignment of the fitting and conduit during self-threading engagement.

The foregoing and other objects, features and advantages of the invention will be apparent from the following more particular description of a preferred embodiment of the invention as illustrated in the accompanying drawings.

BREIF DESCRIPTION OF THE DRAWINGS

FIG. 1 is a side elevation view partly in section, of a prior art self-threading fitting and an electrical conduit.

FIG. 2 is a partial sectional view of the self-threading fitting and conduit arrangement according to the present invention prior to self-threading engagement.

FIG. 3 is a view similar to FIG. 2 but with the fitting and conduit in self-threading engagement.

DETAILED DESCRIPTION OF THE PREFERRED EMBODIMENTS

The principle drawback of prior art self-threading fittings can be best understood by referring to FIG. 1 wherein a prior art fitting 10 having external threads 12 at one end and tapered internal threads 14 at the opposite end is shown misaligned relation to a conduit 16. Due to the internal tapered thread arrangement which is best suited for accommodating conduits having slightly varying external diameters it is easy to dispose the fitting 10 out of axial alignment with the conduit 16 prior to initiating the self-threading operation. Even if the fitting 10 and the conduit 16 are initially in substantial axial alignment as determined by visual observation the application of torque to the wrenching surface 18 would cause misalignment of the fitting and conduit.

In order to overcome these shortcomings the fitting 20 according to the present invention is provided with an insulated liner-guide 22. The fitting per se is similar to the fitting disclosed in FIG. 1 inasmuch as it is provided with external threads 24 at one end and tapered internal threads 26 at the other end, as well as a wrenching surface 28. The liner-guide 22 is comprised of a thin walled injection molded thermoplastic sleeve. The end 30 which is inserted into the fitting 20 is provided with two diametrically opposed slots 32, only one of which is shown in FIG. 2 which will allow the diameter of the end 30 to be reduced during insertion. A tapered retaining flange 34 is provided at the extreme end so that the two halves of the end 30 extending between the slots 32 are cammed inwardly as the liner is pushed into the close fitting throat 36 of the fitting 20. As the tapered retaining flange 34 exits from the fitting the two halves will spring outwardly and the flange 34 will provide considerable resistance to withdrawal back through the throat 36. A second circumferential flange 38 is provided on the liner-guide 22 to prevent the liner-guide from being pushed further into the throat 36. The opposite end 40 of the liner-guide extends substantially beyond the end of the fitting and the diameter of the liner-guide 22 is approximately equal to but slightly less than the internal diameter of a standard electrical conduit 42.

When it is desired to provide a conduit such as the conduit 42 with external threads for coupling to other elements the insulated self-threading fitting 20 of the present invention may be utilized. The end 40 of the liner-guide 22 is inserted into the conduit 42 to axially align the fitting 20 with the conduit 42. The fitting 20 is then threaded onto the end of the conduit 42 by any suitable tool to provide the assembly illustrated in FIG. 3. With the use of a suitable dope the threaded coupling between the conduit and the fitting may be completely waterproof and the presence of the liner-guide 22 will effectively insulate any through-wiring from the metal fitting 20.

It is obvious that the material of the liner-guide 22 could be modified and still provide the necessary insulating function. It is also obvious that the liner-guide 22 could be installed in the fitting by means of heat-sealing in place, cementing in place, press-fitting or the like. While some of these methods of attaching a liner-guide to the fitting are not suitable for field installation the split snap end arrangement disclosed in FIGS. 2 and 3 is readily suitable for field installation.

Although the fitting 20 is shown with external threads 24 at one end, it is obvious that any suitable connecting means could be provided on the fitting in lieu of the threads 24 or in addition thereto.

While the invention has been particularly shown and described with reference to a preferred embodiment thereof it will be understood by those in the art that various changes in form and details may be made therein without departing from the spirit and scope of the invention.

What is claimed is:

1. An insulated self-threading fitting comprising a metal tubular member having connecting means on one end and tapered internal threads inside the opposite end and a liner-guide sleeve of insulating material secured within said tubular member; said liner-guide sleeve extending substantially beyond the end of said tubular member having the internal threads for insertion into a conduit upon which the fitting is to be self-threaded to ensure coaxial alignment of the fitting with such a conduit, said tubular member being provided with a cylindrical throat portion adjacent the end having the connecting means thereon and said liner guide sleeve being provided with an end portion having a diameter substantially equal to the internal diameter of said throat portion with said end portion of said sleeve being defined by two circumferential retaining flanges spaced apart at a distance equal to the length of said throat portion and having slot means extending axially from the end thereof to permit a reduction in diameter to allow insertion of one of said flanges through said thread portion so that said flanges will lock said sleeve against axial movement relative to said tubular member.

* * * * *